United States Patent
Huang et al.

(10) Patent No.: US 12,322,135 B1
(45) Date of Patent: Jun. 3, 2025

(54) METHOD, SYSTEM AND ELECTRONIC EQUIPMENT FOR GAUGE DETECTION OF RAIL VEHICLE BASED ON THREE-DIMENSIONAL POINT CLOUD DATA

(71) Applicants: Nanjing Kingyoung Intelligent Science & Technology Co., Ltd., Nanjing (CN); Shanghai Weitong Vision Technology CO., Ltd., Shanghai (CN)

(72) Inventors: Yi Huang, Nanjing (CN); Yong Zhao, Nanjing (CN); Chunmei Wang, Nanjing (CN)

(73) Assignees: Nanjing Kingyoung Intelligent Science & Technology Co., Ltd., Nanjing (CN); Shanghai Weitong Vision Technology CO., Ltd., Shanghai (CN)

( * ) Notice: Subject to any disclaimer, the term of this patent is extended or adjusted under 35 U.S.C. 154(b) by 0 days.

(21) Appl. No.: 19/024,045

(22) Filed: Jan. 16, 2025

Related U.S. Application Data (63) Continuation of application No. PCT/CN2024/106572, filed on Jul. 19, 2024.

(30) Foreign Application Priority Data

Sep. 6, 2023 (CN) .......................... 202311139839.9

(51) Int. Cl.
*G06T 7/73* (2017.01)
*B61L 27/57* (2022.01)
(Continued)

(52) U.S. Cl.
CPC ................ *G06T 7/74* (2017.01); *B61L 27/57* (2022.01); *G06T 7/0002* (2013.01); *G06T 7/80* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 3,610,754 A | 10/1971 | Pirlet et al. | |
| 11,196,981 B2 * | 12/2021 | Mesher | ................ H04N 13/243 |

(Continued)

FOREIGN PATENT DOCUMENTS

| | | |
|---|---|---|
| CN | 1566906 A | 1/2005 |
| CN | 104567727 A | 4/2015 |

(Continued)

OTHER PUBLICATIONS

Wang Cong-Jun, et al., Parameter calibration of laser scanner for articulated coordinate measuring machine Opto-Electronic Engineering, Jul. 15, 2007, vol. 34, No. 7, pp. 39-44, 49 Full text, Claims involved:1-4.

(Continued)

*Primary Examiner* — James A Thompson
(74) *Attorney, Agent, or Firm* — Piloff Passino & Cosenza LLP; Rachel Piloff; Sean Passino (57) ABSTRACT

A method, a system and electronic equipment for gauge detection of a rail vehicle based on three-dimensional point cloud data are provided. The method for the gauge detection includes following steps: building a gauge detection gate; calibrating multiple laser camera modules and recording calibration parameters; performing a full section scan on an outer contour of the rail vehicle to be detected, generating a three-dimensional point cloud map of the rail vehicle, and drawing body contour data; comparing the body contour (Continued)

data of the current rail vehicle with built-in standard gauge contour data to judge whether the current rail vehicle is out-of-gauge; and outputting comparison results.

4 Claims, 8 Drawing Sheets

(51) Int. Cl.
*G06T 7/00* (2017.01)
*G06T 7/80* (2017.01)

(56) References Cited

U.S. PATENT DOCUMENTS

| | | | |
|---|---|---|---|
| 2013/0287248 | A1 | 10/2013 | Gao et al. |
| 2018/0339720 | A1* | 11/2018 | Singh ............... G06T 7/001 |
| 2020/0207389 | A1* | 7/2020 | Moth ............... B61L 25/025 |
| 2022/0410949 | A1* | 12/2022 | Gonzalez Alvarez .. G01S 17/42 |
| 2024/0174274 | A1* | 5/2024 | Palmer ............ B61L 23/041 |

FOREIGN PATENT DOCUMENTS

| | | |
|---|---|---|
| CN | 105467017 A | 4/2016 |
| CN | 107421502 A | 12/2017 |
| CN | 108759714 A | 11/2018 |
| CN | 108981604 A | 12/2018 |
| CN | 110095061 A | 8/2019 |
| CN | 110473260 A | 11/2019 |
| CN | 112432610 A | 3/2021 |
| CN | 113776454 A | 12/2021 |
| CN | 113859298 A | 12/2021 |
| CN | 114485462 A | 5/2022 |
| CN | 115187676 A | 10/2022 |
| CN | 115393442 A | 11/2022 |
| CN | 115468510 A | 12/2022 |
| CN | 116878419 A | 10/2023 |
| JP | 2012002564 A | 1/2012 |
| KR | 100800554 B | 2/2008 |
| WO | 2010057169 A | 5/2010 |
| WO | 2012167386 A | 12/2012 |

OTHER PUBLICATIONS

Cai Wenze, et al., Calibration Method for 3D Profile of Denture Based on Light Sectioning Measurement, Journal of Xi'an Technological University, vol. 36, No. 8, pp. 618-622 doi: 10.16185/j.jxatu.edu.cn.2016.08.003 Full text, Claims involved:1-4.

Zhang Weiguang et al., Calibration Method for Three-Dimensional Measurement System Based on Linear-Structure Light, Chinese Journal of Lasers, Jan. 10, 2009, vol. 36, No. 1, pp. 182-188 DOI:10.3788/CJL20093601.0182 Full text, Claims involved:1-4.

Wang Chunmei, et al., A Field Calibration Method for Line Structured Light Vision Measurement, Machine Tool & Hydraulics, Nov. 28, 2018, vol. 46, No. 22, pp. 80-83; doi: 10.3969/j.issn. 1001-3881.2018.22.021 Full text, Claims involved:1-4.

Notification to Grant Patent Right for Invention dated Oct. 19, 2023 in SIPO application No. 202311139839.9.

Retrieval report—First search dated Oct. 16, 2023 in SIPO application No. 202311139839.9.

Wang Xian-Yu, et al., Calibration Method for Line Structured Light Detecting Bodywork Space Dimensions, Optics & Optoelectronic Technology, Jun. 10, 2016, vol. 14, No. 03, pp. 22-27 Full text, Claims involved:1-4.

ISR dated Nov. 7, 2024 in PCT/CN2024/106572.

* cited by examiner

METHOD, SYSTEM AND ELECTRONIC EQUIPMENT FOR GAUGE DETECTION OF RAIL VEHICLE BASED ON THREE-DIMENSIONAL POINT CLOUD DATA

CROSS-REFERENCE TO RELATED APPLICATIONS

This application is a continuation of PCT/CN2024/106572, filed Jul. 19, 2024 and claims priority of Chinese Patent Application No. 202311139839.9, filed on Sep. 6, 2023, the entire contents of which are incorporated herein by reference.

TECHNICAL FIELD

The present disclosure belongs to the technical field of image information processing, and in particular relates to a method, a system and electronic equipment for gauge detection of a rail vehicle based on three-dimensional point cloud data.

BACKGROUND

With the progress of global science and technology and the rapid development of economy, urban rail transit is becoming more and more important in the transportation system of some big cities around the world because of its characteristics of rapidity, safety and green. China's urban rail transit has further developed rapidly, and its overall technical level is in the leading position in the world. The safe operation and maintenance of urban rail transit vehicles is an important part of the entire urban rail transit operation system.

The traditional train body space dimension detection uses various tools such as detection tool, detection template, tape measure, plug gauge, etc. When the vehicle passes through the gauge gate, it is necessary for inspectors to manually observe the gap between the surface of the vehicle body and the gauge at multiple positions at the same time to judge the processing quality of the vehicle appearance. When the vehicle collides with the gauge plate of the gauge gate, it indicates that the vehicle appearance dimension at the collision place is out of tolerance, and this detection device is easily influenced by human factors.

In addition, the traditional gauge may only measure a single fixed vehicle model. When new vehicle models are added, the original gauge detection device may not measure, and adding the traditional detection devices for corresponding vehicle models may only solve the temporary needs.

SUMMARY

An objective of the present disclosure is to provide a method, a system and electronic equipment for gauge detection of a rail vehicle based on three-dimensional point cloud data, so as to solve the above problems existing in the prior art.

In one aspect, a method for gauge detection of a rail vehicle based on three-dimensional point cloud data is proposed, steps are as follows:

S1, building: a gauge detection gate is built at a predetermined position where the rail vehicle leaves a garage, and a profilometer is installed on the gauge detection gate, where the profilometer includes multiple laser camera modules, a proximity switch and a speed measuring unit are also installed on the gauge detection gate or at the predetermined position where the rail vehicle leaves the garage.

S2, calibration: multi-module calibration is performed on all the laser camera modules built by using a calibration structure; current calibration parameters of all the laser camera modules are recorded, and the current calibration parameters are used as a point cloud stitching basis for subsequent real rail vehicle images; the function of multi-module calibration is to unify multi-module calibration coordinate systems, and unify each laser camera module coordinate system into the calibration structure coordinate system one by one. The point cloud data of finished contour may be obtained by stitching the point cloud data in the same coordinate system.

S3, detection: when the rail vehicle undergoing gauge detection passes through the gauge detection gate, and the speed measuring unit senses the vehicle speed of the current rail vehicle in real time and reports the vehicle speed to the processing unit; the processing unit adjusts the measurement frequency of the profilometer according to the current vehicle speed, and the profilometer performs a full section scan of the outer contour of the rail vehicle to generate a three-dimensional point cloud map of the current rail vehicle.

S4, comparison of results: the three-dimensional point cloud map of the current rail vehicle generated in the S3 is compared with the built-in standard gauge contour data to judge whether the current rail vehicle is out-of-gauge.

S5, result output: according to the comparison results of the S4, if the current rail vehicle is not out-of-gauge, a notice of not out-of-gauge is sent; if the current rail vehicle is out-of-gauge, a notice of out-of-gauge is sent, and the out-of-gauge parameters (out-of-gauge position, out-of-gauge grade and out-of-gauge value) of the current rail vehicle are provided.

In an embodiment of one aspect, before performing multi-module calibration on all the built laser camera modules by using the calibration structure, whether the factory calibration result of each of the laser camera modules is within the calibration expected range is also verified first, and if the factory calibration result conforms to the calibration expected range, a process of multi-module calibration is directly executed;

if the factory calibration result does not conform to the expected calibration range, firstly, the calibration reference is used to perform single-module calibration on each of the laser camera modules in turn, and then the process of the multi-module calibration is performed after all the laser camera modules complete the single-module calibration. The function of single-module calibration is to determine the transformation relationship (internal and external parameters) between three-dimensional space points and pixel points in the pixel plane under the sawtooth calibration block coordinate system, and determine the distortion system in the process of camera imaging for image correction.

In an embodiment of one aspect, the calibration reference includes a sawtooth calibration block vertically set on a horizontal plane or a reference containing a predetermined calibration pattern (such as a checkerboard); the calibration structure is a frame formed by multiple sawtooth calibration blocks, and the upper part and both sides of the calibration structure are sawtooth calibration blocks connected end to end.

In an embodiment of one aspect, the process of single-module calibration includes:

correcting calibration: adjusting the position of the sawtooth calibration block, so the sawtooth calibration block and the line laser emitted by one of the laser camera modules are located on the same vertical axis;

collecting images: adjusting the distance between the one of the laser camera modules and the sawtooth calibration block, and collecting N images at positions with N different distances, where N≥1; and starting calibration: respectively calculating the positions of the feature points of the peaks and the valleys of N images in the image coordinate system according to straight line fitting and a formula of straight line intersection calculation, then calculating the transformation relationship from the pixel coordinate system of the laser camera module to the sawtooth calibration block coordinate system according to known actual sizes between the peaks and the valleys, and saving data of the transformation relationship as a single-module calibration file.

In an embodiment of one aspect, the laser camera module coordinate system is transformed into the calibration structure coordinate system by performing multi-module calibration on all the built laser camera modules:

S2-1, 3D profiles collected by all the laser camera modules are loaded;

S2-2, the bevel data of the sawtooth is extracted, and the straight line is fitted by the least square method, and then the intersection of the two oblique lines is calculated, thus obtaining the 3D coordinates of the sawtooth vertex in the laser camera module coordinate system;

S2-3, the 3D coordinates of the sawtooth point in the calibration structure coordinate system are obtained according to the physical size of the calibration structure;

S2-4, the rotation and translation transformation matrix is calculated, and the transformation relationship from the laser camera module coordinate system to the calibration structure coordinate system is obtained by calculation, and the sawtooth line is transformed from the laser camera module coordinate system to the calibration structure coordinate system, so the sawtooth line and the sawtooth point coincide in a predetermined range; and S2-5, the current calibration parameters are saved as a multi-module calibration file for subsequent multi-camera point cloud stitching.

In an embodiment of one aspect, step S3 also includes:

S3-1, loading the 3D model of predetermined images and the multi-module calibration file saved in step S2-5 locally, and processing the actually collected point cloud data to make the profile of the fixed position out-of-gauge, simulating the out-of-gauge state, and verifying whether the gauge detection model is capable of detecting the out-of-gauge position:

if the currently constructed gauge detection model successfully detects the out-of-gauge position and the out-of-gauge amount, saving the current gauge detection model as the basis for subsequent out-of-gauge detection;

if the currently constructed gauge detection model is not capable of detecting the out-of-gauge position or the deviation value of the detected out-of-gauge amount is greater than the expected value, returning to step S2 to re-execute the calibration procedure for the laser camera module;

S3-2, when the rail vehicle undergoing gauge detection passes through the gauge detection gate, sensing the vehicle speed of the current rail vehicle by the speed measuring unit in real time and reporting to the processing unit; and S3-3, using the gauge detection model saved in the S3-1 to generate a three-dimensional point cloud map of the current rail vehicle, and displaying body contour data of the current rail vehicle.

In an embodiment of one aspect, step S4 also includes:

S4-1, based on the three-dimensional point cloud map drawn in step S3-3, calculating coordinates of the maximum Z value corresponding to each X position to obtain maximum contour points; and S4-2, judging whether all maximum contour points are out-of-gauge:

if all the maximum contour points are not out-of-gauge, all contours are not out-of-gauge;

if any at least one of the maximum contour points is out-of-gauge, checking whether all the profiles are out-of-gauge through the X range of the current maximum contour point out-of-gauge.

In an embodiment of one aspect, the odd number of intersections between the horizontal ray of the point and the area is used to judge that it is in the closed area; if the horizontal line drawn to the right has even intersections with the edge of the closed area, the current point is outside the closed area; and if the horizontal line drawn to the right has odd intersections with the edge of the closed area, the current point is in the closed area.

In one aspect, a system for gauge detection of a rail vehicle is proposed. The system for the gauge detection of the rail vehicle may be used to drive the method for the gauge detection of the rail vehicle proposed in one aspect. The system for the gauge detection of the rail vehicle includes two parts: rail side detection equipment and rail side machine room equipment.

The rail side detection equipment includes a gauge detection gate, and a profilometer, a proximity switch and a speed measuring radar installed on the gauge detection gate, where the profilometer includes multiple laser camera modules.

The rail side machine room equipment is used for real-time communication with the rail side detection equipment, and the rail side machine room equipment includes a vehicle gauge image acquisition system in communication connection with the profilometer and a processing unit in communication connection with the vehicle gauge image acquisition system.

The processing unit adjusts the measurement frequency of the profilometer according to the current vehicle speed, and the profilometer performs a full section scan of the outer contour of the rail vehicle to generate a three-dimensional point cloud map of the current rail vehicle, and compares the generated three-dimensional point cloud map of the current rail vehicle with the built-in standard gauge contour data to judge whether the current rail vehicle is out-of-gauge;

according to the comparison results, if the current rail vehicle is not out-of-gauge, the processing unit sends a notice of not out-of-gauge;

if the current rail vehicle is out of gauge, a notice of out-of-gauge is sent to the engineer, and the out-of-gauge parameters (out-of-gauge position, out-of-gauge grade and out-of-gauge value) of the current rail vehicle are provided.

In one aspect, electronic equipment is proposed, where the electronic equipment includes a processor, a memory, a communication interface and a communication bus, where the processor, the memory and the communication interface communicate with each other through the communication bus; the memory is used for storing at least one executable instruction, and the executable instruction causes the processor to execute the method for the gauge detection of the rail vehicle disclosed in one aspect.

The present disclosure has the following beneficial effects.

Compared with the traditional detection tool for rail vehicles, the method and the system for the gauge detection of the rail vehicle based on the three-dimensional point cloud data provided by the present disclosure meet the measurement requirements of automation, non-contact, high precision and no damage.

The method and the system for the gauge detection of the rail vehicle based on the three-dimensional point cloud data provided by the present disclosure may realize the detection of different vehicle models, and only need to input the relevant data of the current vehicle model into the background database for different vehicle models, thus solving the limitations of traditional detection.

The automatic detection technology of space size has the advantages of simultaneous multi-point measurement and real-time display of space geometric size. The welding structure of rail vehicle system may more intuitively reflect the changes of vehicle body size during the welding process, which is of great help to detect the vehicle body and improve the process.

For a large number of carriage data, the maximum contour is calculated and whether the maximum contour is out-of-gauge is detected. On the basis of out-of-gauge detection of the maximum contour, all the profiles out-of-gauge are retrieved, thus greatly improving the detection efficiency. By using this targeted algorithm, the time for out-of-gauge detection algorithm is greatly shortened.

DETAILED DESCRIPTION OF THE EMBODIMENTS

In the following description, numerous specific details are given in order to provide a more thorough understanding of the present disclosure. However, it will be apparent to those skilled in the art that the present disclosure may be practiced without one or more of these details. In other instances, in order to avoid confusion with the present disclosure, some technical features well known in the art have not been described.

Figure 1:
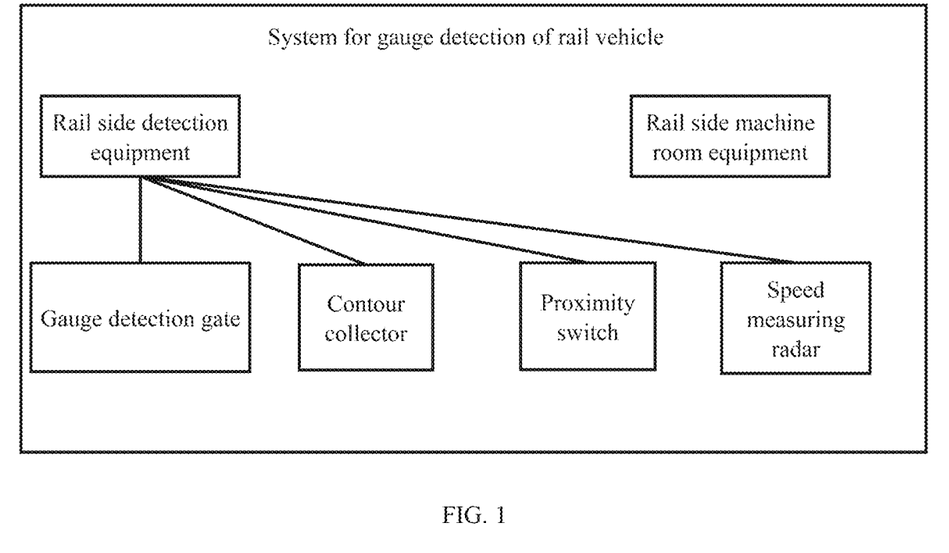
FIG. 1 is a schematic diagram of a system for gauge detection of a rail vehicle based on three-dimensional point cloud data.

This embodiment proposes a system for gauge detection of a rail vehicle based on three-dimensional point cloud data, as shown in FIG. 1. The system for the gauge detection of the rail vehicle consists of two parts: rail side detection equipment and rail side machine room equipment.

The rail side detection equipment includes a gauge detection gate, a profilometer, a proximity switch 7 and a speed measuring unit. The profilometer, the proximity switch 7 and the speed measuring unit are respectively installed on the gauge detection gate.

In this embodiment, the profilometer is composed of multiple laser camera modules. The proximity switch 7 may be a photoelectric switch, and the photoelectric switch is used to sense whether the object is approaching, that is, to sense whether the rail vehicle 3 to be detected is approaching the gauge detection gate. When the train triggers the photoelectric switch, the system controller receives the incoming signal to turn on the laser cameras, and collects the train laser profile data when the train passes through.

The rail side machine room equipment is used for real-time communication with the rail side detection equipment, and the rail side machine room equipment includes a vehicle gauge image acquisition system in communication connection with multiple laser camera modules, and a processing unit in communication connection with the vehicle gauge image acquisition system.

The function of the laser camera here is to project structured light on the surface of the detected object, forming a light stripe on the surface of the detected object, and shoot this light stripe with the camera on the other side, and then transform the two-dimensional information of the light stripe image into three-dimensional information through camera calibration technology and reconstruction technology, so as to realize the measurement of the surface data of the object. By using the laser camera modules, 3D point cloud data of the outer contour of the train section at different depths of field may be obtained in a large field of view scene (2 meters (m) range).

In this embodiment, the whole measurement system needs at least six measuring modules, so the three-dimensional dimensions of the whole section need to unify the data of six laser camera modules into a world coordinate system (calibration structure coordinate system), and the spatial dimensions of corresponding points on the vehicle interface may be measured after the whole system is calibrated in advance. After obtaining the measurement results, the gauge information of the vehicle may be obtained by comparing the measurement results with the standard dimensions of the vehicle input into the measurement system before measurement.

In this embodiment, the calibration structure is a frame formed by multiple sawtooth calibration blocks, and the upper part and both sides of the calibration structure are sawtooth calibration blocks connected end to end.

It should be noted that the laser camera modules may be calibrated when they leave the factory. If the calibration results are in line with expectations, the process of multi-module calibration may be directly executed without performing separate calibration for each camera module, thus transforming the laser camera module coordinate system into the calibration structure coordinate system. Here is a feasible process of multi-module calibration.

Firstly, 3D profiles collected by all the laser camera modules are loaded. Then, the bevel data of the sawtooth is extracted, and the straight line is fitted by the least square method, and then the intersection of the two oblique lines is calculated, thus obtaining the 3D coordinates of the sawtooth vertex in the laser camera module coordinate system. The 3D coordinates of the sawtooth point in the calibration structure coordinate system are obtained according to the physical size of the calibration structure. Then, the rotation and translation transformation matrix is calculated, and the transformation relationship from the laser camera module coordinate system to the calibration structure coordinate system is obtained by calculating with the least square method, and the sawtooth line is transformed from the laser camera module coordinate system to the calibration structure coordinate system, so the sawtooth line and the sawtooth point coincide in a predetermined range. The current calibration parameters are saved as a multi-module calibration file for subsequent multi-camera point cloud stitching.

If the factory calibration result does not conform to the expected calibration range, firstly, the calibration reference is used to perform single-module calibration on each of the laser camera modules in turn, and then the process of the multi-module calibration is performed after all the laser camera modules complete the single-module calibration. Here, a feasible process for calibration of a single laser camera module is provided.

Firstly, a movable bracket is built, and the camera module is erected on the movable bracket for single-module calibration, and the movable bracket may slide on the guide rail to adjust the distance relative to the calibration block. The position of the sawtooth calibration block is adjusted so that the sawtooth calibration block and the line laser emitted by the laser camera module are located on the same vertical axis. At least three sawtooth images are obtained by collecting pictures at 1800 millimeters (mm), 2000 mm and 2300 mm away from the sawtooth calibration block respectively. According to straight line fitting and a formula of straight line intersection calculation, the positions of the feature points of the peaks and the valleys of at least three sawtooth images in the image coordinate system are calculated respectively, and then the transformation relationship from the pixel coordinate system of the camera to the sawtooth calibration block coordinate system is calculated according to the known actual sizes between the peaks and the valleys, and the transformation relationship data is saved as a single-module calibration file.

Figure 7:
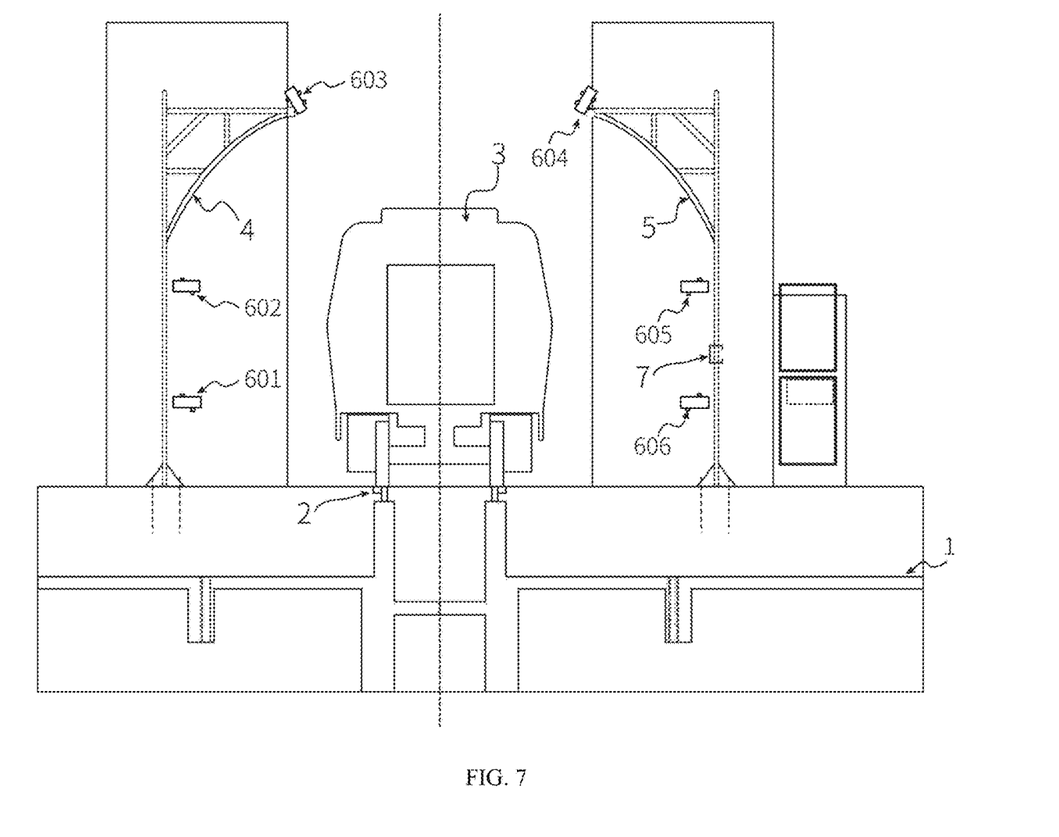
FIG. 7 is a front view of a gauge detection gate.
Figure 8:
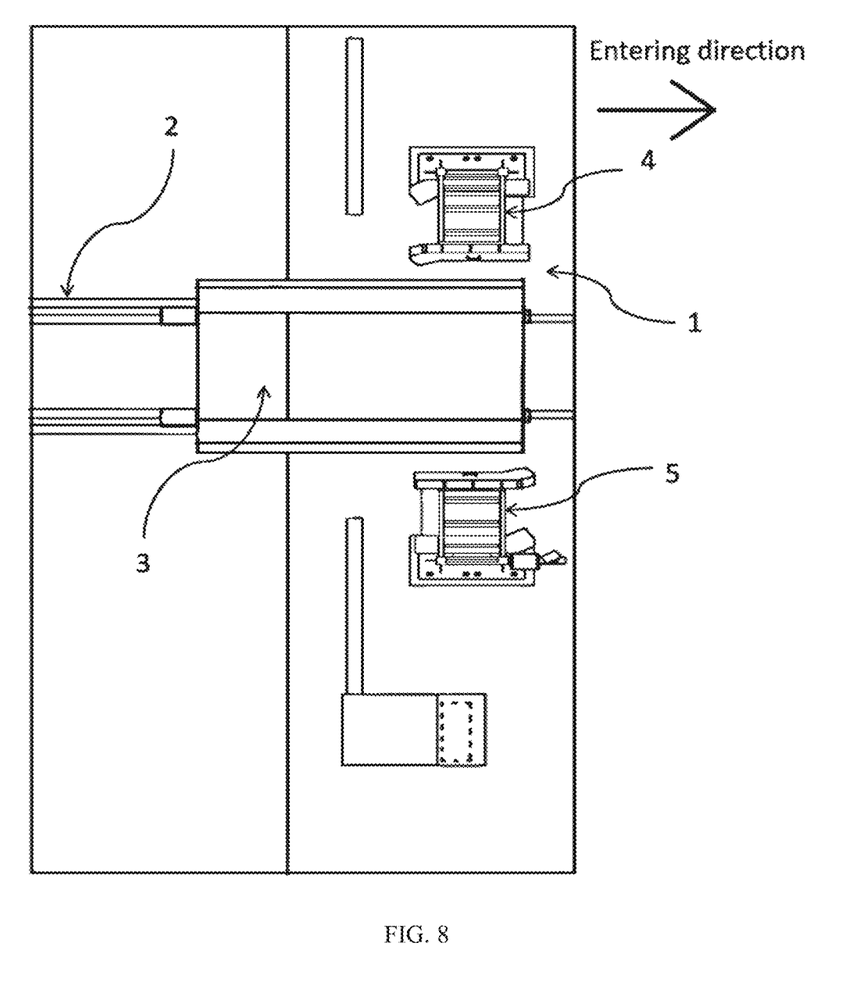
FIG. 8 is a top view of a gauge detection gate.

In this embodiment, the structure of the gauge detection gate is shown in FIG. 7 (front view) and FIG. 8 (top view). The gauge detection gate includes a foundation pit 1, a track 2 is paved on the foundation pit 1, and a first stand 4 and a second stand 5 are also fixed on the foundation pit 1, and the first stand 4 and the second stand 5 are respectively symmetrically arranged along the center line of the track 2.

The first stand 4 and the second stand 5 have the same structure, including a vertical part fixed on the foundation pit 1 and an arc part welded on the upper part of the vertical part and bent toward the rail vehicle 3 by a predetermined arc; a first laser camera module 601 and a second laser camera module 602 are respectively installed on the vertical part of the first stand 4 from low to high; a third laser camera module 603 is installed at the end of the arc part of the first stand 4; a speed measuring unit is also installed between the first laser camera module 601 and the second laser camera module 602; a sixth laser camera module 606 and a fifth laser camera module 605 are respectively installed on the vertical part of the second stand 5 from low to high; the fourth laser camera module 604 is installed at the end of the arc part of the second stand 5; and a proximity switch 7 is also installed between the sixth laser camera module 606 and the fifth laser camera module 605;

where, the first laser camera module 601, second laser camera module 602, fifth laser camera module 605 and sixth laser camera module 606 project line lasers along their respective horizontal directions; and the third laser camera module 603 and fourth laser camera module 604 project line lasers obliquely downward along a predetermined included angle.

Figure 2:
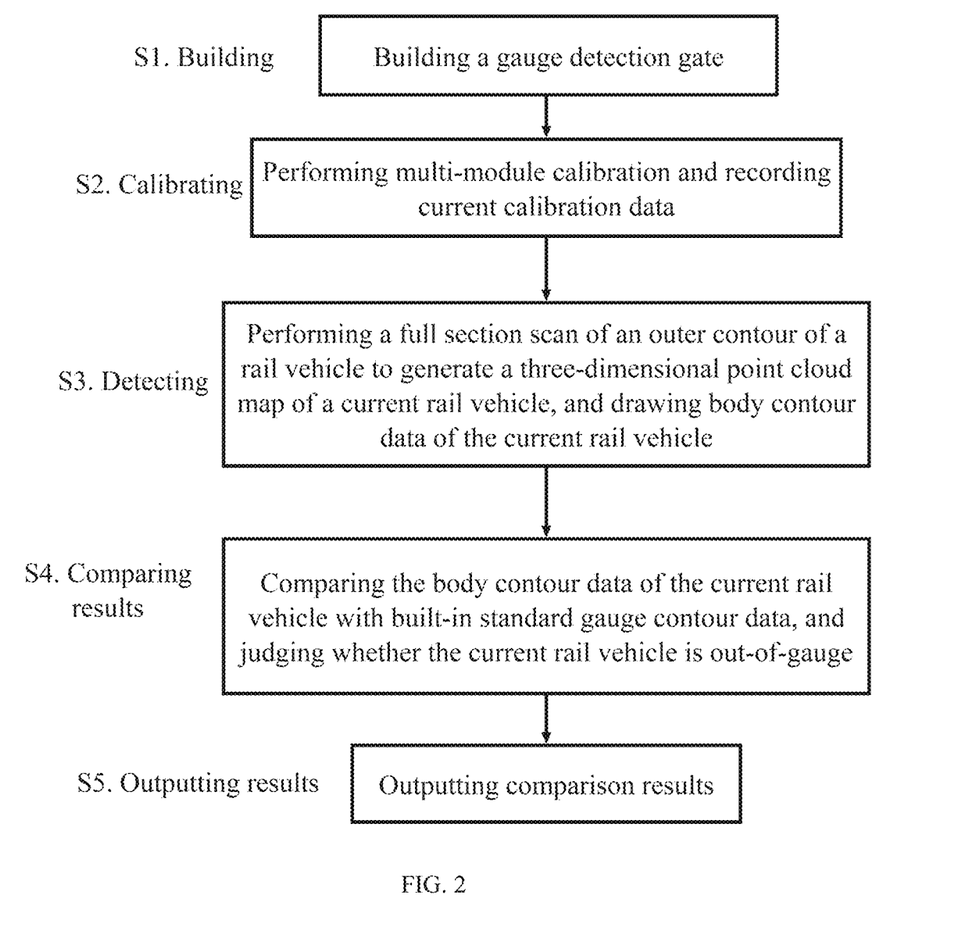
FIG. 2 is a flow chart of a method for gauge detection of a rail vehicle according to the present disclosure.

Based on the system for the gauge detection of the rail vehicle proposed in the above embodiment, a flow of a method for gauge detection of a rail vehicle 3 based on three-dimensional point cloud data is also proposed, as shown in FIG. 2. The method for the gauge detection of the rail vehicle 3 includes the following steps:

S1, building: a gauge detection gate is built at a predetermined position where the rail vehicle 3 leaves the garage, and a profilometer is installed on the gauge detection gate, where the profilometer includes multiple laser camera modules, a proximity switch 7 and a speed measuring unit are also installed on the gauge detection gate or at the predetermined position where the rail vehicle 3 leaves the garage.

S2, calibration: multi-module calibration is performed on all the laser camera modules built by using a calibration structure; current calibration parameters of all the laser camera modules are recorded, and the current calibration parameters are used as a point cloud stitching basis for the subsequent images of the real rail vehicle 3.

The following is a specific process of multi-module calibration.

As long as the transformation matrix is calculated, the corresponding coordinates of point P in coordinate system A in coordinate system B may be calculated, namely:

$$P_B = T * P_A + t,$$

where T is a 3×3 transformation matrix and t is a 3×1 displacement transformation vector. Theoretically, as long as there are three pairs of points, T and t may be calculated, and the more pairs of points, the more accurate the calculated transformation is. $P_B$ represents the point P in the B coordinate system, and $P_A$ represents the point P in the A coordinate system.

The coordinate system of each of the laser camera modules/Each laser camera module coordinate system is unified in the calibration structure coordinate system one by one, and the point cloud data of the finished contour may be obtained by simply accumulating the point cloud data in the same coordinate system.

Figure 6:
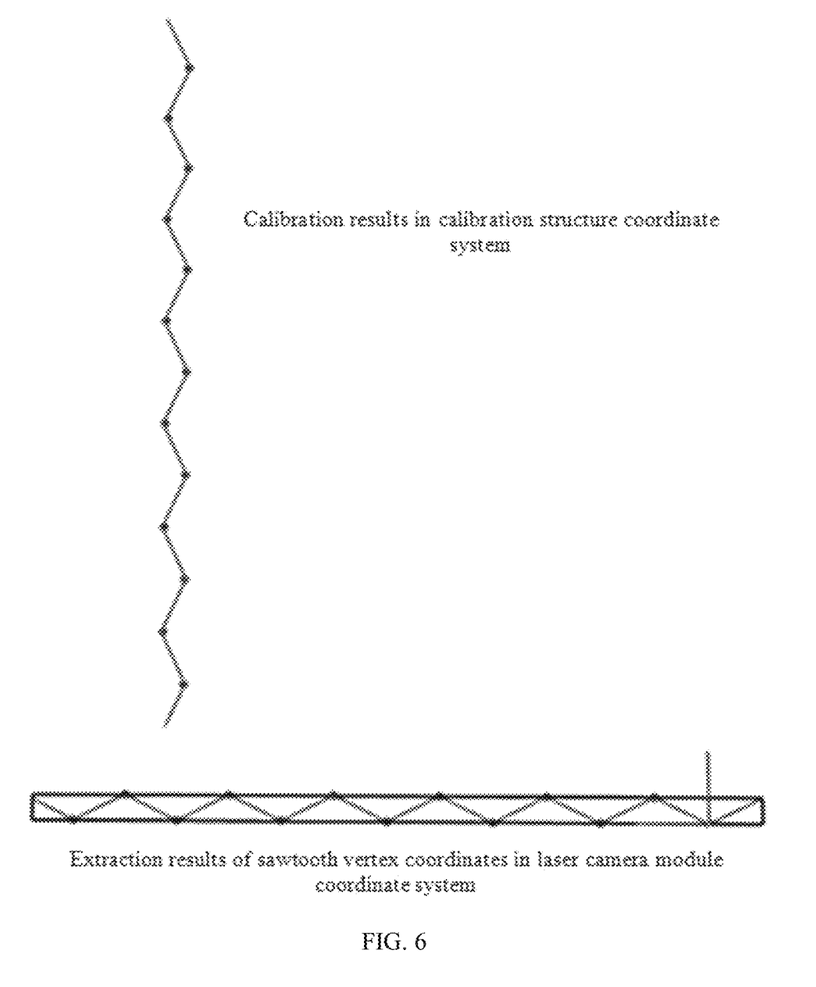
FIG. 6 is an interface diagram of multi-laser camera module calibration.

A self-made calibration structure is adopted to unify the multi-laser camera module coordinate systems. The calibration structure is a frame formed by multiple sawtooth calibration blocks, and the upper part and both sides of the calibration structure are sawtooth calibration blocks connected end to end. The calibration structure is placed in the middle of the track 2, and the six laser camera modules and the calibration structure are leveled in the cameras' field of vision. Then, each camera collects and saves the 3D images separately, and the calibration process starts after the collection is completed. The calibration interface is shown in FIG. 6.

Loading of camera profiles: the 3D profiles collected by the cameras are loaded.

Extraction of sawtooth point: bevel data of the sawtooth is extracted, a straight line is fitted by the least square method, and then the intersection of two oblique lines is calculated, thus obtaining 3D coordinates of the sawtooth vertex in the laser camera module coordinate system.

Import of target point file: the 3D coordinates of the sawtooth point in the calibration structure coordinate system (envelope coordinate system) are obtained according to the physical size of the calibration structure.

Calculation of rotation and translation transformation matrix: the transformation relationship from the laser camera module coordinate system to the calibration structure coordinate system is calculated by least square method.

Rotation and translation transformation: the sawtooth line is transformed from the laser camera module coordinate system to the calibration structure coordinate system, and basically coincides with the sawtooth point.

Calibration file saving: the calibration file is saved for subsequent multi-camera point cloud stitching.

Repeating camera by camera: since each camera is calibrated separately, this method reduces the cumulative error of calibration of every two cameras.

The intelligent 3D cameras are numbered as shown in FIG. 7. The arrangement naming convention is from bottom left to top left, and then from top right to bottom right, in the order of "Camera 1", "Camera 2", "Camera 3", "Camera 4", "Camera 5", and "Camera 6".

The IP addresses of the equipment have been fixed and will not be changed. The host IP address of each camera has been configured according to the following table. If it is necessary to unplug the network cable, be sure to plug the network cable back into the original network port position when plugging in the network cable, otherwise the camera will not be connected.

TABLE 1

Communication address table of each of laser camera modules

| Equipment number or name | IP address of host network port | Equipment IP address |
| --- | --- | --- |
| Camera 1 | 192.168.1.100 | 192.168.1.101 |
| Camera 2 | 192.168.2.100 | 192.168.2.101 |
| Camera 3 | 192.168.3.100 | 192.168.3.101 |
| Camera 4 | 192.168.4.100 | 192.168.4.101 |
| Camera 5 | 192.168.5.100 | 192.168.5.101 |
| Camera 6 | 192.168.6.100 | 192.168.6.101 |

In addition to the above-mentioned matters needing attention in calibration, there are many points worthy of attention in the whole calibration process.

(1) The sawtooth blocks of the calibration structure should be kept clean and level, otherwise the calibration accuracy will be affected, and attention should be paid to moistureproof and waterproof.

(2) The calibration structure needs static drawing to avoid calibration error.

(3) In the calibration process, IP numbers and module numbers should be in one-to-one correspondence. With reference to the table above, the numbers should not be mistaken and the data should not be wrong.

A feasible scheme of rotation and translation transformation matrix is given below.

The coordinate values $$\begin{bmatrix} Xc \\ Yc \\ Zc \end{bmatrix}$$

of the feature points of the peaks and the valleys in the laser camera module coordinate system are as follows:
(−1116.4,0,−1291.93);
(−968.098,0,−1357.08);
(−733.922,0,1668.96);
(−668.07,0,−1364.39);
(−516.348,0,−1306.55);
(−368.043,0,−1371.7);
(−216.32,0,−1313.86);
(−68.0148,0,−1379.01);
(83.7075,0,−1321.17);
(232.013,0,−1386.32);
(383.735,0,−1328.48);
(532.041,0,−1393.63);
the coordinates $$\begin{bmatrix} Xw \\ Yw \\ Zw \end{bmatrix}$$

of the peaks and the valleys in the calibration structure coordinate system (calibration structure coordinate system) are as follows:
(−1485.1,0,375);
(−1546.1,0,525);
(−1484.1,0,675);
(−1545.1,0,825);
(−1483.1,0,975);
(−1544.1,0,1125);
(−1482.1,0,1275);
(−1543.1,0,1425);
(−1481.1,0,1575);
(−1542.1,0,1725);
(−1480.1,0,1875);
(−1541.1,0,2025);
the R and t matrix is calculated according to the following formula:

$$\begin{bmatrix} X_C \\ Y_C \\ Z_C \end{bmatrix} = R \begin{bmatrix} X_W \\ Y_W \\ Z_W \end{bmatrix} + t = \begin{bmatrix} R & t \end{bmatrix} \begin{bmatrix} X_w \\ Y_w \\ Z_w \\ 1 \end{bmatrix}$$

$$\text{where } R = \begin{bmatrix} 0.0277 & 0 & 0.9996 \\ 0 & -0.9999 & 0 \\ 0.9996 & 0 & -0.0277 \end{bmatrix}, t = \begin{bmatrix} -1450.1499 \\ 0 \\ 203.5595 \end{bmatrix}.$$

During detection, the object contour point cloud captured by each camera will be unified from the laser camera module coordinate system to the calibration structure coordinate system by using the R and t transformation matrix. In the same coordinate system, the point cloud data is stitched to complete the contour point cloud data.

In an embodiment, before performing multi-module calibration on all the built laser camera modules by using the calibration structure, whether the factory calibration result of each of the laser camera modules is within the calibration expected range is also verified first, and if the factory calibration result conforms to the calibration expected range, a process of the multi-module calibration is directly executed; if the factory calibration result does not conform to the expected calibration range, firstly, the calibration reference is used to perform single-module calibration on each of the laser camera modules in turn, and then the process of the multi-module calibration is performed after all the laser camera modules complete the single-module calibration. The function of single-module calibration is to determine the transformation relationship (internal and external parameters) between three-dimensional space points and pixel points in the pixel plane under the sawtooth calibration block coordinate system, and determine the distortion system in the process of camera imaging for image correction.

A single-module calibration process is given below.

The position of the sawtooth calibration block is adjusted so that the sawtooth calibration block and the line laser emitted by the laser camera module are located on the same vertical axis, the distance between the laser camera module and the sawtooth calibration block is adjusted, and a sawtooth image at the positions where the laser camera module is 1800 mm, 2000 mm and 2300 mm away from the sawtooth calibration block is collected respectively.

The laser light source projects onto the surface of the object, and the camera lens forms a certain angle with the laser to generate the outline of the surface of the object. The laser is projected on the sawtooth calibration block, and the camera may take a picture to obtain the sawtooth image. According to the straight line fitting (Ransac algorithm and least square method) and the formula of straight line intersection calculation, the positions of the feature points of the peaks and the valleys in the image coordinate system are calculated, and then according to the known actual sizes between the peaks and the valleys, the rotation and translation transformation matrix, that is, the transformation matrix between the laser camera module coordinate system and the calibration structure coordinate system, is calculated.

S3, detection: when the rail vehicle 3 undergoing gauge detection passes through the gauge detection gate, and the speed measuring unit senses the vehicle speed of the current rail vehicle 3 in real time and reports the vehicle speed to the processing unit, and the processing unit adjusts the measurement frequency of the profilometer according to the current vehicle speed. If the measurement frequency of the profilometer is constant, the sampling interval will change with the change of vehicle speed, so the measurement frequency of the profilometer may be adjusted in real time to adapt to the change of vehicle speed and ensure the consistency of sampling resolution/sampling interval. The profilometer performs a full section scan of the outer contour of the rail vehicle 3 to generate a three-dimensional point cloud map of the current rail vehicle 3, and draws the body contour data of the current rail vehicle 3 according to the three-dimensional point cloud data.

S3-1, a standard straight line gauge is drawn according to the gauge standard of the current model rail vehicle 3, a coordinate system is constructed, and the coordinates of each key control point are marked;

S3-2, the 3D model of predetermined images and the multi-module calibration file saved in step S2-5 are loaded locally, and the actually collected point cloud data is processed to make the profile of the fixed position out-of-gauge, an out-of-gauge state is simulated, and whether the out-of-gauge position may be successfully detected by the gauge detection model is verified:

if the currently constructed gauge detection model successfully detects the out-of-gauge position and the out-of-gauge amount, the current gauge detection model is saved as the basis for subsequent out-of-gauge detection;

if the currently constructed gauge detection model is not capable of detecting the out-of-gauge position or the deviation value of the detected out-of-gauge amount is greater than the expected value, step S2 is returned to re-execute the calibration procedure for the laser camera module;

S3-3, when the rail vehicle undergoing gauge detection passes through the gauge detection gate, the speed measuring unit senses the vehicle speed of the current rail vehicle 3 in real time and reports the vehicle speed to the processing unit;

S3-4, the processing unit adjusts the measurement frequency of the profilometer according to the current vehicle speed, and the profilometer performs a full section scan of the outer contour of the rail vehicle 3; and S3-5, a three-dimensional point cloud map of the current rail vehicle 3 is generated by using the gauge detection model saved in S3-2, and the three-dimensional point cloud map is displayed on the coordinate system constructed in S3-1, showing the body contour data of the current rail vehicle 3.

A feasible scheme for out-of-gauge detection is given in combination with an actual case.

Figure 3:
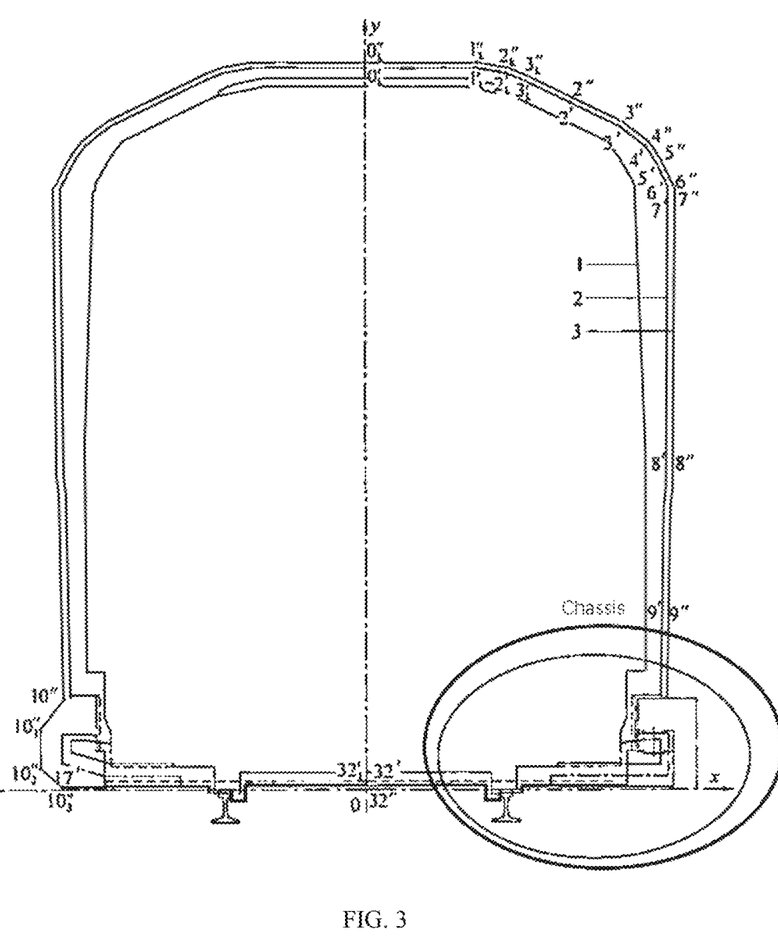
FIG. 3 is a gauge diagram drawn according to a standard gauge of an A1 vehicle in an embodiment of the present disclosure.

Firstly, a straight line gauge is drawn according to the metro gauge standard. A1 vehicle is taken as an example, the vehicle gauge and equipment gauge of the A1 vehicle are shown in FIG. 3:

the lateral gauge is taken and the coordinates are completed.

The gauge coordinate values of the A1 vehicle are in table 2.

TABLE 2

| Vehicle gauge coordinate values of A1 vehicle (mm) | | | | | | | | | |
|---|---|---|---|---|---|---|---|---|---|
| Control point | 0'k | 1'k | 2'k | 3'k | 2' | 3' | 4' | 5' | 6' | 7' |
| X' | 0 | 597 | 755 | 839 | 1103 | 1367 | 1503 | 1564 | 1636 | 1640 |
| Y' | 3900 | 3900 | 3872 | 3839 | 3712 | 3584 | 3478 | 3388 | 3246 | 3199 |
| Control point | 8' | 9' | 10' | 11' | $11'_1$ | 12' | 13' | $13'_1$ | 14' | 15' |
| X' | 1626 | 1599 | 1600 | 1445 | 1430 | 1445 | 1445 | 1430 | 1405 | 1480 |
| Y' | 1766 | 960 | 510 | 510 | 510 | 295 | 210 | 210 | 210 | 300 |
| Control point | 16' | 17' | $17'_1$ | 18' | $18'_1$ | $18'_2$ | $18'_3$ | $18'_4$ | 26' | 27' |
| X' | 1630 | 1630 | 1630 | 1405 | 1405 | 1405 | 995 | 995 | 837 | 837 |
| Y' | 300 | 143.5 | 75 | 25 | 45 | 75 | 75 | 25 | 25 | −17 |

After drawing the standard straight line gauge, the 3D model and calibration file are loaded locally, and the original points are processed, so that the section at the fixed position is out-of-gauge for subsequent detection.

Figure 4:
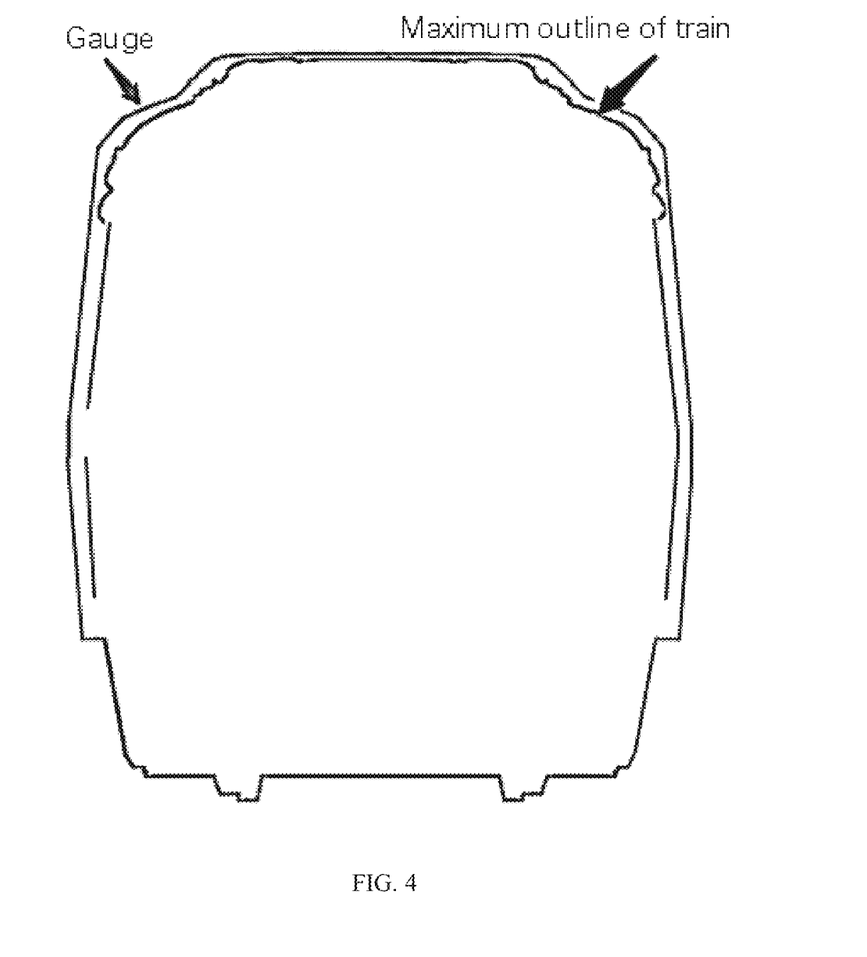
FIG. 4 is a schematic diagram for judging whether a maximum contour is out-of-gauge.

The detection principle is as follows: the maximum contour is obtained, as shown in FIG. 4, and whether the maximum contour is out-of-gauge is judged: if the maximum contour is not out-of-gauge, all contours do not are out-of-gauge; if the maximum contour is out-of-gauge, checking whether all the profiles are out-of-gauge through the x range of the maximum contour out-of-gauge.

As may be seen in FIG. 4, the outer frame line is a gauge. The inner frame line is the maximum contour line of the train at the current out-of-gauge detection, and the maximum contour line consists of several point sets. It is judged whether out-of-gauge by judging the x value of each point in the point set and the boundary of the closed area. If less than n points are outside the closed area, it means not out-of-gauge, and if at least n points are outside the closed area, it means out-of-gauge.

Because the upper part of the gauge range is larger than the lower part, it is inconvenient for subsequent processing if a rasterized x corresponds to multiple Y values. At present, the odd number of intersections between the horizontal ray of the point and the area is used to judge that it is in the closed area, as shown in FIG. 5.

Figure 5:
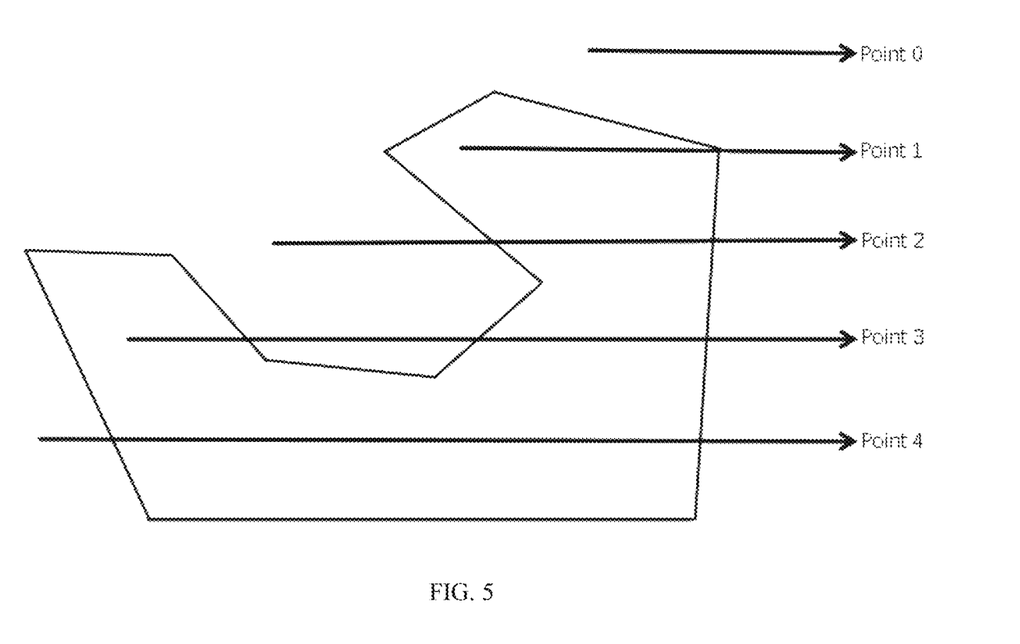
FIG. 5 is a schematic diagram of a preferred processing method for judging whether a maximum contour is out-of-gauge.

As shown in closed area in FIG. 5, and the point is any point (0, 1, 2, 3, 4, 5) in FIG. 5. Corresponding to the closed area in the algorithm, the gauge range of the train refers to the outer frame area in FIG. 4, and this point refers to a point (scanned outline) in the point set in FIG. 4.

As shown by point 0 in the figure, the horizontal line drawn to the right has 0 intersection (even number) with the edge of the closed area, indicating that the point is outside the closed area.

As shown by point 1 in the figure, if the horizontal line drawn to the right has one intersection (odd number) with the edge of the closed area, the point 1 is in the closed area.

S4, comparison of results: the body contour data of the current rail vehicle 3 generated in the S3 is compared with the built-in standard gauge contour data to judge whether the current rail vehicle 3 is out-of-gauge.

S5, result output: according to the comparison results of the S4, if the current rail vehicle 3 is not out-of-gauge, the current detection result is saved and the release permission result is issued; if the current rail vehicle 3 is out-of-gauge, the current detection result is saved, and the out-of-gauge position, out-of-gauge grade and out-of-gauge value of the current rail vehicle 3 are provided.

In summary, the present disclosure proposes a technical solution for the gauge detection of the rail vehicle 3, which adopts a laser sensor, a proximity switches 7, and visual sensor technology to quickly and accurately detect the section/contour of the vehicle. The scanning results are automatically compared with the standard gauge data pre-stored in the database. If an object invades the gauge, the system will give an alarm and save the detection results. The collection (optional picture collection), analysis, processing, transmission, and printing of gauge detection data for various types of metro vehicles may be achieved, and the corresponding detection results may be quickly provided. When the train passes through, the system automatically performs full section scan on the outer contour of the detected vehicle to form a three-dimensional point cloud map (vehicle contour map). The vehicle model is automatically recognized by the vehicle number recognition system, and the standard gauge data of the detected vehicle pre-stored in the system is retrieved for comparison, so as to automatically detect whether the vehicle is out-of-gauge in real time, and provide the out-of-gauge position, out-of-gauge grade, out-of-gauge value, etc. for the out-of-gauge vehicle.

As mentioned above, although the present disclosure has been shown and described with reference to certain preferred embodiments, it should not be construed as limiting the present disclosure itself. Various changes in form and details may be made therein without departing from the spirit and scope of the present disclosure as defined in the appended claims.

What is claimed is:

1. A method for gauge detection of a rail vehicle based on three-dimensional point cloud data, comprising following steps:
S1, building: building a gauge detection gate at a predetermined position wherein the rail vehicle leaves a garage, and installing a profilometer on the gauge detection gate, wherein the profilometer comprises a plurality of laser camera modules, a proximity switch and a speed measuring unit are further installed on the gauge detection gate or at the predetermined position wherein the rail vehicle leaves the garage;
verifying whether a factory calibration result of each of the laser camera modules is within a calibration expected range, and if the factory calibration result conforms to the calibration expected range, directly executing a process of multi-module calibration; and
if the factory calibration result does not conform to the calibration expected range, firstly, using calibration reference to perform single-module calibration on each of the laser camera modules in turn, and then performing the process of the multi-module calibration after all the laser camera modules complete the single-module calibration, wherein the calibration reference comprises a sawtooth calibration block vertically set on a horizontal plane;
a process of the single-module calibration comprises:
correcting calibration: adjusting a position of the sawtooth calibration block, so the sawtooth calibration block and a line laser emitted by each of the laser camera modules are located on a same vertical axis;
collecting images: adjusting a distance between each of the laser camera modules and the sawtooth calibration block, and collecting N images at positions with N different distances, wherein N≥1;
starting calibration: respectively calculating positions of feature points of peaks and valleys of the N images in an image coordinate system according to straight line fitting and a formula of straight line intersection calculation, then calculating a transformation relationship from a pixel coordinate system of each of the laser camera modules to a sawtooth calibration block coordinate system according to known actual sizes between the peaks and the valleys, and saving data of the transformation relationship as a single-module calibration file;
S2, calibrating: performing the multi-module calibration on all the laser camera modules built by using a calibration structure, wherein the calibration structure is a frame formed by a plurality of sawtooth calibration blocks, and an upper part and both sides of the calibration structure are the sawtooth calibration blocks connected end to end;
recording current calibration parameters of all the laser camera modules, and using the current calibration parameters as a point cloud stitching basis for subsequent real rail vehicle images;

by performing the multi-module calibration on all the built laser camera modules, transforming a laser camera module coordinate system into a calibration structure coordinate system;

S2-1, loading 3D profiles collected by all the laser camera modules;

S2-2, extracting bevel data of a sawtooth, fitting extracted bevel data into a straight line, and then calculating to obtain an intersection of two oblique lines, thus obtaining 3D coordinates of a sawtooth vertex in the laser camera module coordinate system;

S2-3, obtaining 3D coordinates of a sawtooth point in the calibration structure coordinate system according to a physical size of the calibration structure;

S2-4, calculating a rotation and translation transformation matrix, calculating to obtain a transformation relationship from the laser camera module coordinate system to the calibration structure coordinate system, and transforming a sawtooth line from the laser camera module coordinate system to the calibration structure coordinate system, so the sawtooth line and the sawtooth point coincide in a predetermined range; and S2-5, saving the current calibration parameters as a multi-module calibration file for subsequent multi-camera point cloud stitching;

S3, detecting: when the rail vehicle undergoing gauge detection passes through the gauge detection gate, sensing a vehicle speed of a current rail vehicle by the speed measuring unit in real time and reporting to a processing unit; and performing a full section scan of an outer contour of the rail vehicle by the profilometer to generate a three-dimensional point cloud map of the current rail vehicle;

S4, comparing results: comparing the three-dimensional point cloud map of the current rail vehicle generated in the S3 with built-in standard gauge contour data to judge whether the current rail vehicle is out-of-gauge; and S5, outputting results: according to comparison results of the S4, if the current rail vehicle is not out-of-gauge, sending a notice of not out-of-gauge; and if the current rail vehicle is out-of-gauge, sending a notice of out-of-gauge, and providing out-of-gauge parameters of the current rail vehicle.

2. The method for the gauge detection of the rail vehicle according to claim 1, wherein step S3 further comprises:

S3-1, loading a 3D model of predetermined images and the multi-module calibration file saved in step S2-5 locally, and processing actually collected point cloud data to make a profile of a fixed position out-of-gauge, simulating an out-of-gauge state, and verifying whether a gauge detection model is capable of detecting an out-of-gauge position:

if the gauge detection model currently constructed successfully detects the out-of-gauge position and an out-of-gauge amount, saving the current gauge detection model as a basis for subsequent out-of-gauge detection; and if the gauge detection model currently constructed is not capable of detecting the out-of-gauge position or a deviation value of detected out-of-gauge amount is greater than an expected value, returning to step S2 to re-execute a calibration procedure for the laser camera modules;

S3-2, when the rail vehicle undergoing the gauge detection passes through the gauge detection gate, sensing the vehicle speed of the current rail vehicle by the speed measuring unit in real time and reporting to the processing unit; and S3-3, using the gauge detection model saved in the S3-1 to generate the three-dimensional point cloud map of the current rail vehicle, and displaying body contour data of the current rail vehicle.

3. The method for the gauge detection of the rail vehicle according to claim 2, wherein step S4 further comprises:

S4-1, based on the three-dimensional point cloud map drawn in step S3-3, calculating coordinates of a maximum Z value corresponding to each contour point on an X axis to obtain maximum contour points; and S4-2, judging whether all the maximum contour points are out-of-gauge:

if all the maximum contour points are not out-of-gauge, all contours are not out-of-gauge; and if any at least one of the maximum contour points is out-of-gauge, checking whether all profiles are out-of-gauge through a range of a current maximum contour point out-of-gauge on the X axis.

4. The method for the gauge detection of the rail vehicle according to claim 3, wherein an odd number of intersections between a horizontal ray of the point and an area is used to judge being in a closed area;

if a horizontal line drawn to right has even intersections with edges of the closed area, a current point is outside the closed area; and if the horizontal line drawn to the right has odd intersections with the edges of the closed area, the current point is in the closed area.

* * * * *